United States Patent [19]

Fuller

[11] Patent Number: 5,797,659
[45] Date of Patent: Aug. 25, 1998

[54] LUG NUT APPARATUS WITH SQUARE DRIVE

[75] Inventor: Everett Fuller, Orange, Calif.

[73] Assignee: Coyote Enterprises, Inc., Anaheim, Calif.

[21] Appl. No.: 758,700

[22] Filed: Dec. 3, 1996

[51] Int. Cl.⁶ ...................................................... B60B 3/16
[52] U.S. Cl. ..................... 301/35.62; 301/111; 411/410; 411/910
[58] Field of Search ........................... 301/35.62, 35.63, 301/111, 112, 114, 115, 122; 411/403, 404, 407, 410, 427, 429, 910; 81/436, 460, 185, 177.2, 121.1

[56] References Cited

U.S. PATENT DOCUMENTS

| | | | |
|---|---|---|---|
| 4,384,812 | 5/1983 | Miyagawa | 411/410 |
| 4,427,326 | 1/1984 | Hobson et al. | 411/910 |
| 4,616,535 | 10/1986 | Chiavon | 411/410 |
| 5,216,940 | 6/1993 | Hedden | 81/177.2 |
| 5,302,069 | 4/1994 | Toth et al. | 411/429 |
| 5,324,149 | 6/1994 | Bainbridge et al. | 411/405 |

OTHER PUBLICATIONS

"Parts & Accessories", J.C. Whitney & co., catalog No. 466B, p. 123, Dec. 1985.

*Primary Examiner*—Russell D. Stormer
*Attorney, Agent, or Firm*—Fulwider Patton Lee & Utecht, LLP

[57] ABSTRACT

A cylindrical lug nut is formed with a threaded axially inwardly opening bore and a concentric chamfer for abutting the chamfer and the lug nut bore of a wheel and an axially outwardly opening lug socket for complemental receipt of a square drive lug for driving of the lug nut. An adapter may be provided which includes on one end a square lug and on the other end axially stacked bosses having, respectively, a large hexagonal cross section for receipt in a large hexagonal socket of one conventional tire wrench and a smaller hexagonal socket of a second tire wrench.

23 Claims, 3 Drawing Sheets

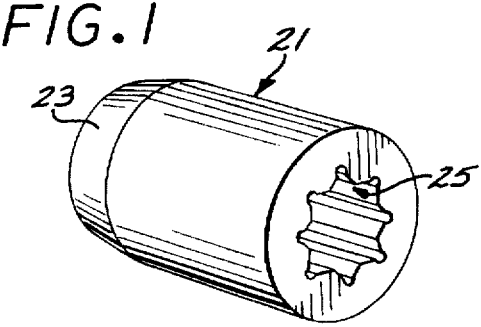
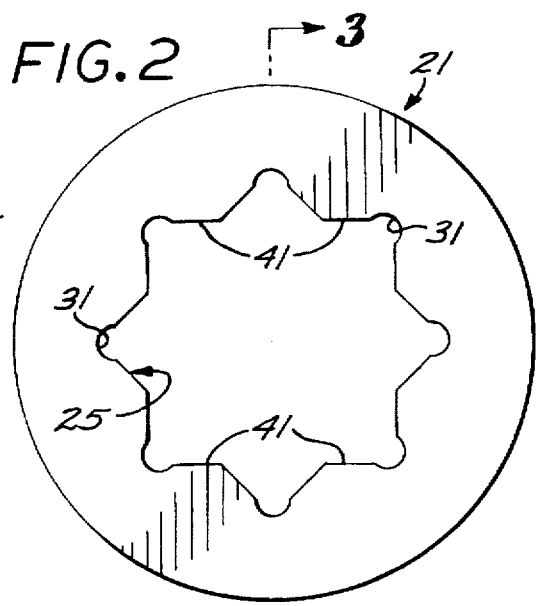
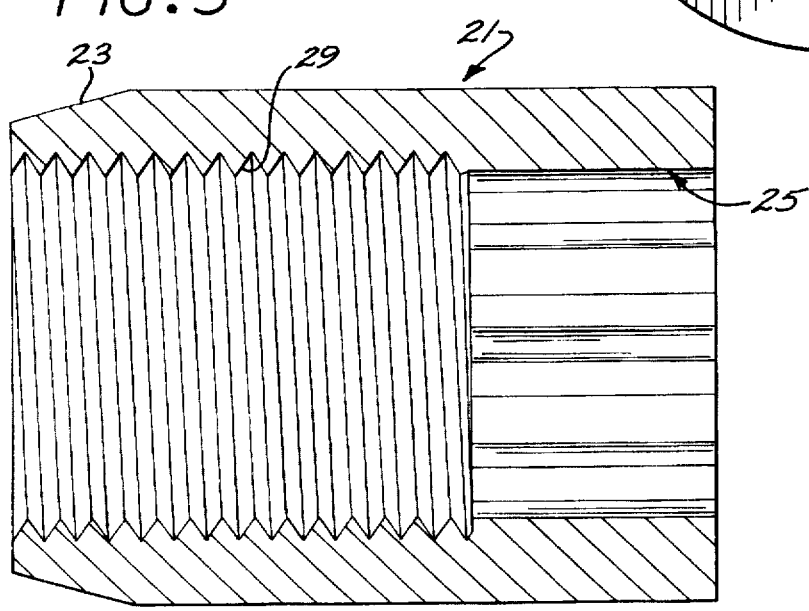
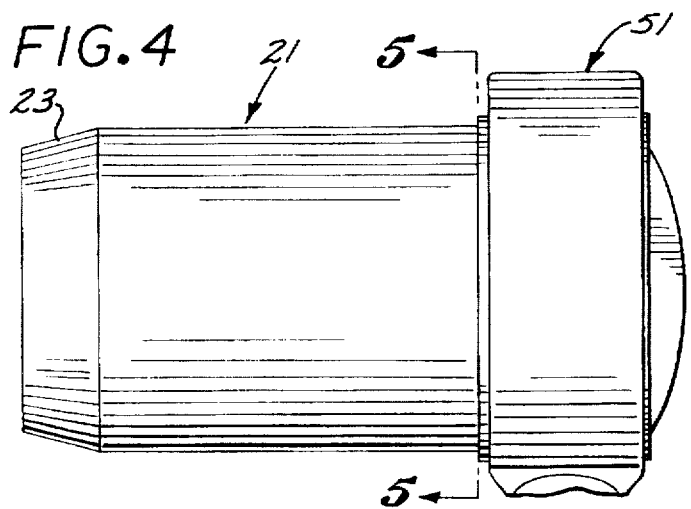
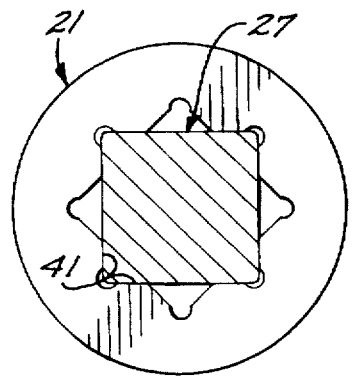

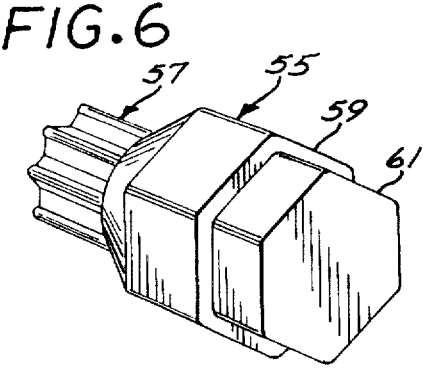
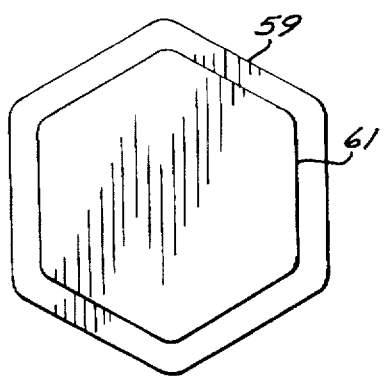
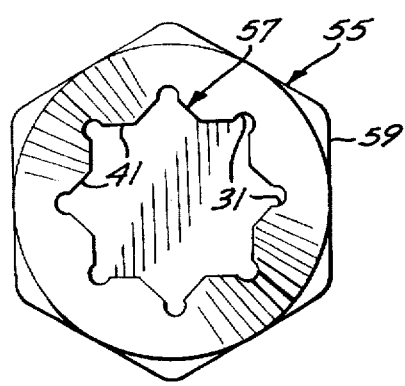
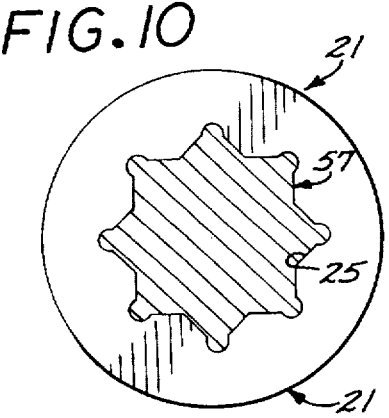
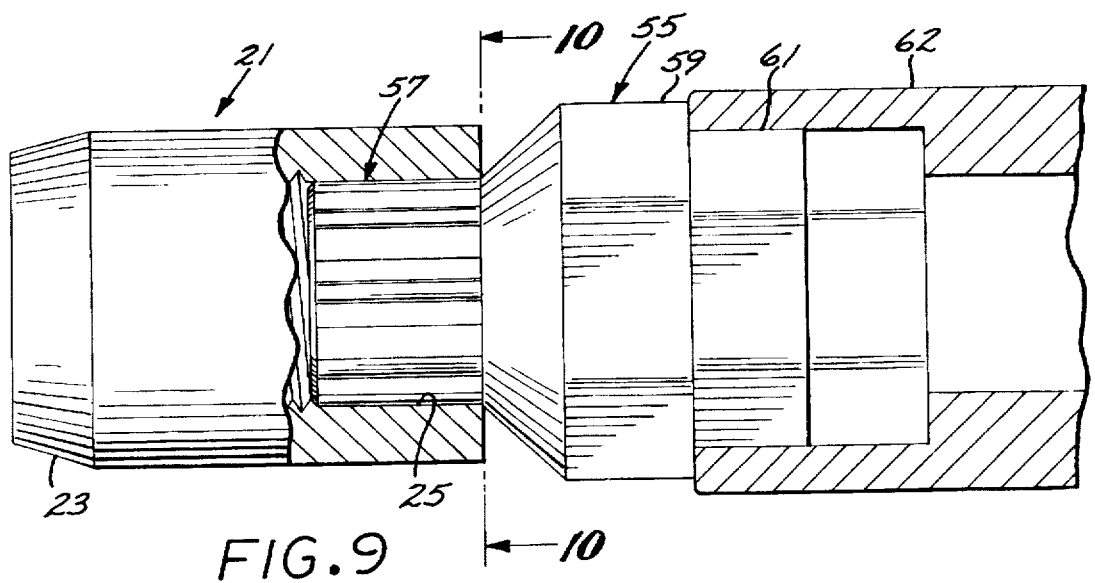

LUG NUT APPARATUS WITH SQUARE DRIVE

BACKGROUND OF THE INVENTION

1. Field of the Invention

The present invention relates to lug nuts utilized to mount wheels from a hub carrying a plurality of lugs.

2. Description of the Prior Art

The development of lug nuts has a long history. Over the years, it has been common practice to construct lug nuts with a standard hexagonal configuration for receipt in the sockets of conventional tire wrenches having standard hexagonal sockets. These lug nuts are typically formed on their inner ends with axially and radially inwardly angled chamfers which abut complimentary chamfers formed concentrically in a wheel bore. Wheels typically include reinforcing pads welded to the front of the wheel having clearance holes concentric with the wheel bores but of a larger diameter for receipt therein of the tip of a thin wall drive socket to allow the socket to nest down over the lug nut. These clearance bores must thus have a substantial diameter, thereby necessitating the removal of a substantial-amount of metal from the reinforcing bores which tends to weaken the overall structure of the wheel.

There has been a demand for a lug nut configured for engagement by a tool in a manner which does not require clearance around the exterior periphery of the lug nut itself. It has been proposed to construct lug nuts with axially outwardly opening hexagonal sockets for receipt of the hexagonal shape of a relatively large conventional Allen wrench driver. One device proposed includes studs threadable into threaded bores formed in the hub and having stud heads configured with outwardly opening hexagonal sockets, all intended to cooperate with a gearing system incorporated in the hub. A device of this type is shown in U.S. Pat. No. 4,925,249 to Auspelmyer.

These devices suffer the shortcoming that a user must then stock Allen wrench drivers having a relatively large cross section to complementally fit the relatively large sockets typically incorporated in such lug nuts. Often times, a car owner does not possess an Allen wrench of this configuration and, thus, when the custom Allen wrench becomes lost or misplaced, great difficulty can be encountered in endeavoring to remove or tighten lug nuts on a wheel. This difficulty is compounded in a tire outlet where wheels are removed and mounted on a high volume basis. Such lug nuts with Allen wrench sockets have not gained wide acceptance because, not only do car and truck owners themselves not typically have in their possession Allen wrenches of the size necessary for engagement with such lug nut sockets, but the professionals are also typically without Allen wrenches of this type. Rather, tire shops typically employ air wrenches or the like which incorporate a one-half inch square lug on which is mounted an adapter having a hexagonal socket for receipt over conventional hexagonal lug nuts. Consequently, a need exists for a lug nut which will engage directly with such drive sockets without the necessity of intermediate socket adaptors or custom made, oversize Allen wrenches. Over the years, numerous different security lug nut devices have been proposed to inhibit theft of custom automotive wheels and the like. A typical approach has been to configure the lug nut heads with custom configured engagement recesses for mating with correspondingly custom configured drivers. Devices of this type are shown in U.S. Pat. Nos. 4,681,299 to Hobson Etal. and 4,480,513 to McCauley. Other efforts have lead to a proposal for inhibiting the theft of the outside wheel of a dual wheel truck assembly. One such proposal suggests removal of selected ones of the threaded hub mounting studs and substitution therefor of a stud formed with an integral flat head configured with an outwardly opening square socket of a non-conventional size. A device of this type is shown in U.S. Pat. No. 4,277,107 to Stone. Devices of this type, while satisfactory for their intended purpose, suffer the shortcoming that for removal and mounting of the wheel the workman must employ two different style drivers, one for the hex nuts screwed onto the conventional studs and another of a custom configuration having a square lug driver of a non-conventional size for fitting into the flat head studs. Thus, there continues to be a need for a lug nut apparatus which may be driven by a conventional square male lug and which will mate with wheel lug bores and chamfers of a relatively small diameter.

SUMMARY OF THE INVENTION

The lug nut apparatus of the present invention is characterized by a plurality of lug nuts formed on their axial inner ends with external radially and axially inwardly angled chamfers for mating with the complementary chamfers formed on the lug nut mounting holes of a wheel and internally threaded and formed on their distal ends with respective square lug sockets. The lug sockets are configured to mate with a standard square male driver lug. In one embodiment of the present invention, an adapter is provided with a male lug configured at one end to be received in such male socket and is configured with a distally projecting boss formed with one or more hexagonal male driver heads which may be engaged by the socket drivers of conventional tire wrenches.

Other objects and features of the invention will become apparent from consideration of the following description taken in conjunction with the accompanying drawings.

BRIEF DESCRIPTION OF THE DRAWINGS

FIG. 1 is a perspective view of a lug nut incorporated in one embodiment of the lug nut apparatus of the present invention;

FIG. 2 is the right hand end view, in enlarged scale, of the lug nut shown in FIG. 1;

FIG. 3 is a transverse sectional view taken along the line 3—3 of FIG. 2;

FIG. 4 is a front view, in enlarged scale, of the lug nut shown in FIG. 1 but with a driver engaged therewith;

FIG. 5 is a transverse sectional view taken along the line 5—5 of FIG. 4;

FIG. 6 is a perspective view of a driver adapter which may be employed with the lug nut shown in FIG. 1;

FIG. 7 is a right hand end view, in enlarged scale, of the adapter shown in FIG. 6;

FIG. 8 is a left hand end view, in enlarged scale, of the adapter shown in FIG. 6;

FIG. 9 is a front view, partially broken away, and in enlarged scale, of the lug nut shown in FIG. 1 engaged by the adapter shown in FIG. 6;

FIG. 10 is transverse sectional view taken along the line 10—10 of FIG. 9;

DESCRIPTION OF THE PREFERRED EMBODIMENT

Figure 11:
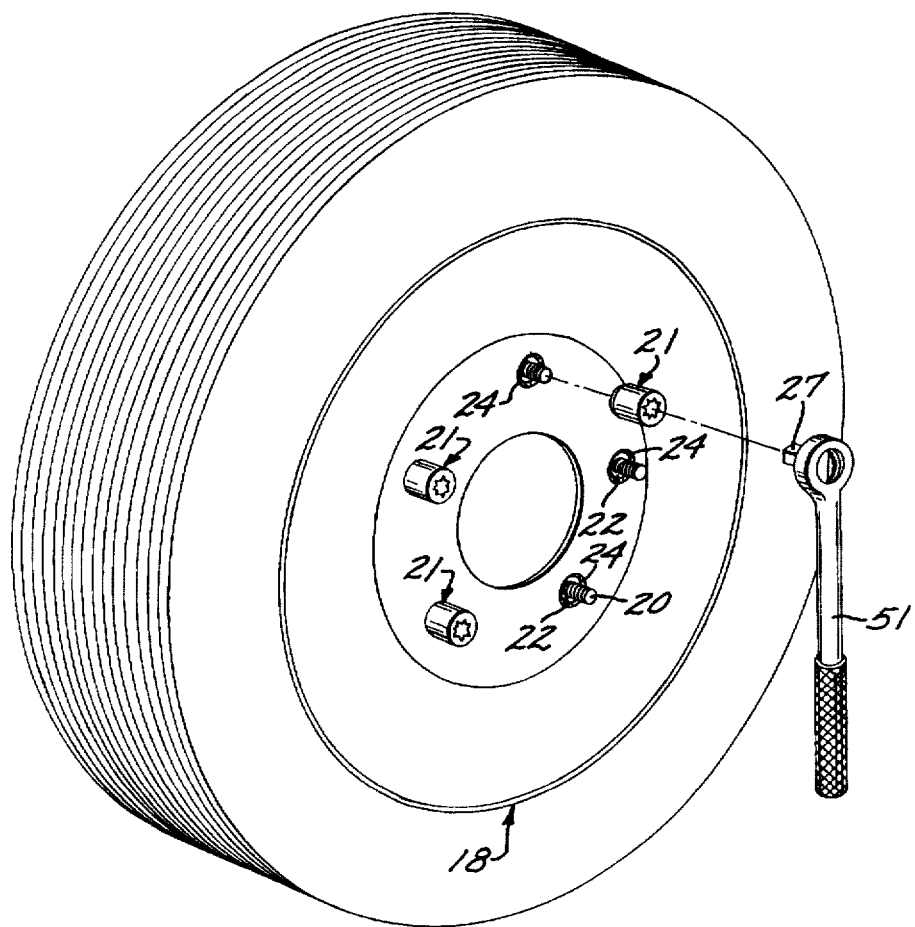
FIG. 11 is a perspective view, in reduced scale, showing the lug nut apparatus of FIG. 1 utilized to mount a wheel to a hub.

Referring to FIGS. 1 and 3, the lug nut apparatus of the present invention includes, generally, a barrel shaped housing 21 having a cylindrical peripheral wall and formed at the end proximate the wheel with an axially and radially inwardly angled chamfer 23 and at its distal end with an axially opening eight point star shaped socket, generally designated 25, formed in cross section by two superimposed square patterns having drive facets dispersed in respective square patterns for receipt in one of such patterns a square lug 27 (FIG. 5) of a driver 51 (FIG. 4). The lug nut 21 is internally threaded at 29 for screwable receipt directly on the lug stud of a conventional wheel hub. Consequently, the lug nut may be driven by a driver having a conventionally shaped square lug 27 and may be applied to a wheel having a mounting bore 22 configured with the conventional chamfer 24 (FIG. 11) of a relatively small diameter and the lug nut may be conveniently removed by any one of a number of different tools, such as socket wrench drivers, air hammer driver lugs or even a square rod having a configuration complementing that of the socket 25.

With the advent of expensive machined wheels presenting an extremely attractive decorative look, numerous different manufacturers have adopted the practice of manufacturing lug nuts having customized drive sockets which are only engageable by drivers having a customized configuration. Even in the eveat of conventional hexagonal lug nuts, because of the length of the lug studs and configuration of the hexagonal nuts, only tools, such as tire wrenches and the like, having special lug nut engagement configurations may be employed to drive such lug nuts. Moreover, the wheels are typically constructed with annular reinforcing plates overlying the lug-nut bores through the body of the respective rims and themselves formed with enlarged aligned bores having diameters sufficiently large to provide clearance to accept the peripheral wall of a thin walled drive socket of a tire wrench telescoped thereover to tighten or loosen such lug nuts. Since these clearance bores in the reinforcing plates may be on the order of one and one-quarter inch in diameter for a thirteen-sixteenth inch diameter lug nut, it is not unusual, particularly for a hole pattern having five lug studs on a four and one-half inch diameter hole pattern, for the clearance bores to overlap the central hub opening thereby causing significant structural weakening. Consequently, there exists a need for a lug nut arrangement which does not require access to the periphery of the lug nut for tightening and loosening thereof thus eliminating the necessity of providing for peripheral clearance for access by a female drive socket. There exists a further need for a lug fastener which can be driven by a lug nut driver of a conventional configuration so that conventional tools normally available in a workman's tool box or in the work bay of a service station or tire or wheel retail outlet so that time is not lost in endeavoring to locate a customized driver tool particularly adapted to the configuration of the lug nut. For the purpose of this invention, it will be appreciated that the term "conventionally sized square leg sockets" shall mean a non-customized, square cross section socket, for fitting a conventionally sized lug of, for instance, one-half or three-eighths inch with square configuration such as that incorporated in a conventional socket wrench handle or pneumatic driver.

The lug nut 21 of the present invention may be constructed of SAE standard 1030 stainless steel chrome plated finish, and may be constructed for use with, for instance, a conventional one-half inch or three-eighths inch driver lug 27 (FIG. 5) of a socket wrench 51 (FIG. 11) or corresponding lug on an air or impact wrench (not shown). As an example, for the three-eighths inch drive lug 27, the lug nut may be constructed with an external major diameter of 0.790 inch and overall length of 1.29 inches. The internal threads may be in the form of onehalf inch right hand threads. Referring to FIG. 2, the socket 25 is of constant cross section throughout its axial depth (FIG. 3) and is configured in cross section to form the sides of two identical square patterns, rotated 45 degrees to one another for receipt of the lug 27 (FIG. 5) in any one of eight different positions. The respective square patterns may be formed with respective sides defining flats 41 having a length of between 0.377 inches and 0.383 inches. Formed at the corners of the respective squares are respective semi-cylindrical cut-outs 31 having a radius of about 0.030 inches. The diametrical distance between the most distal points on the diametrically opposed cut-outs 31 is between about 0.532 and 0.538 inches.

Referring to FIG. 4, the chamfer 23 at the axially inner end of the lug nut is funnel shape so that the opposite diametrical sides thereof form an angle of 60 degrees to one another or, individually, 30 degrees to the axis.

Figure 12:
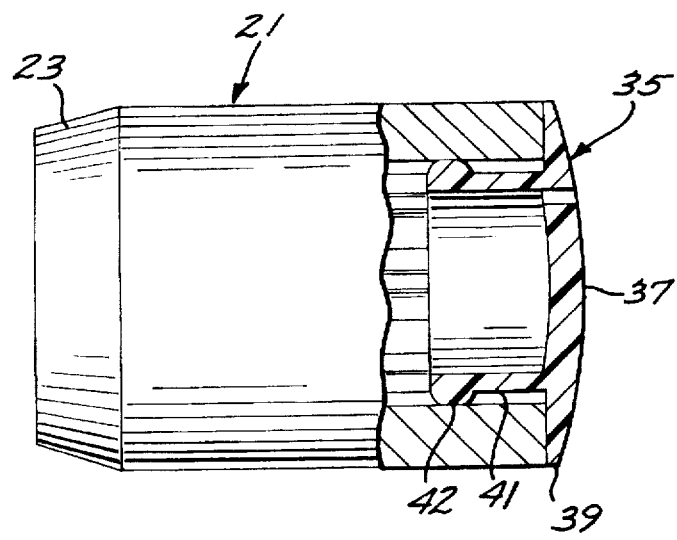
FIG. 12 is a partially broken away front view, in enlarged scale, of the lug nut apparatus shown in FIG. 1 but with a dust cap mounted thereon.

Referring to FIG. 12, a dust cap, generally designated 35 may be provided for closing the distal end of the socket 25. The dust cap 35 may be formed with a generally circularly shaped, domed cap 37 formed with a peripheral flange 39 and having an axially inwardly projecting fastener skirt 41 configured with an annular rib 42 which frictionally engages in interference fit with one of the radially inner extent of the eight point start socket 25 (FIG. 2).

Referring to FIG. 11, in operation it will be appreciated that the lug nuts 21 of the present invention may be employed to mount a wheel 18 from conventional threaded lug studs 20 projecting from a hub. The wheel 18 may be positioned with the bores 22 receiving the lug studs 20. The lug nuts may be threaded on the respective studs 20 and turned hand tight manually. A conventional driver, such as a ratchet wrench, handle 51 or the like incorporating a square three-eighths inch drive lug 27 may then be engaged with the socket 25 to provide the mechanical advantage needed to tighten the lug nuts 21 firmly on the respective lugs to engage the lug chamfer 23 with the chamfer 24 of the wheel to thereby center the respective bores about the respective lug studs 20 ad act to hold the wheel firmly in position when all such lug nuts 21 are firmly tightened on the respective lug studs.

It will be appreciated by those skilled in the art that automobile owners accustomed to conventional tire wrenches and the like having conventional hexagonal shaped sockets for engaging conventional hexagon lug nuts may feel more secure having the capability to tighten or loosen the lug nuts 21 by use of such a conventional tire wrench. For this purpose, included with the lug nut apparatus is adapter, generally designated 55, (FIG. 9) which conveniently includes an 8 point star shaped stem, generally designated 57, configured in cross section to be complementally received in the socket 25. The distal axial end of the adapter 55 is then formed with an enlarged hexagonal boss 59 for receipt of a thirteen-sixteenths inch, conventional hexagonal lug nut wrench socket, and a smaller three-quarter inch distal hexagonal boss 61 to be engaged by a three-quarters inch hexagonal socket. The cross sectional dimension of the hex boss 59 may be between 0.797 and 0.087 inches and that for the hex boss 61 between 0.735 and 0.745 inches.

The adapter 55 is conveniently constructed with the drive stem 57 having a length of 0.5 inches. The height of the smaller hex boss 61 is about 0.46 inches and the overall combined height of the two bosses 59 and 61 about 0.9 inches. The adapter may be constructed of chrome vanadium material with black oxide finish.

In use, when a user elects to use a conventional tire wrench having a standard three-quarter inch or five-eighths inch hexagonal socket, the adapter 55 may be withdrawn from the glove compartment or other storage location and the dust cap 35 removed from the respective sockets 25 and the drive stem 57 inserted therein. The selected tire wrench may then be engaged over the three-quarter inch hex boss 59 or five-eighths inch hex boss 61, as the case may be, and the mechanical advantage provided thereby applied to the lug nut 21.

From the foregoing it will be appreciated that the lug nut apparatus of the present invention provides an efficient and economical apparatus for securely holding a wheel on a hub and which can conveniently be driven by a conventional driver having a conventional square drive lug. Thus, in practice, readily available tools, such as the packed wrenches having a drive lug of conventional size, as for instance three-eighths inch or one-half inch square cross section, may be employed to tighten or loosen the lug nut 21 as the case may be.

What is claimed is:

1. Lug nut apparatus for use with a conventional drive tool having a solid drive lug with a predetermined square cross section, said apparatus comprising:

a wheel formed with a plurality of lug nut bores for fitting in close spaced relationship over the lug studs of a wheel hub and respective axially outwardly facing peripheral wheel chamfers;

a plurality of lug nuts formed with cylindrical peripheral surfaces and terminating on their respective axial inner ends with respective nut chamfers configured to complementally abut the respective said wheel chamfers; and said lug nuts being further formed in their respective axial outer extremities with axially outwardly opening lug sockets of said predetermined square cross section configured for complemental free telescopical receipt of said solid drive lug whereby said lug nuts may be screwably threaded out the respective said studs and said conventional drive tool positioned to selectively engage said lug freely in the respective said sockets so that rotation of said tool will cause said lug to rotate said lug nuts on the respective studs.

2. Lug nut apparatus as set forth in claim 1 for alternative use with a first conventional lug nut wrench configured with a conventional hexagonal socket and including:

an elongated adapter including a square cross section adaptor lug configured for complemental fitting in said lug sockets and projecting axially outwardly therefrom to form a hexagonal boss for receipt in said conventional hexagonal socket.

3. Lug nut apparatus as set forth in claim 2 for use with either said first conventional lug nut wrench or a second conventional lug nut wrench formed with respective first and second hexagonal sockets of a first cross section and second smaller cross section, respective, and wherein:

said adapter includes a first boss formed with a first hexagonal cross section to complementally receive said first hexagonal socket and a second boss axially distal of said first boss and configured for complemental receipt thereover of the said second hexagonal socket.

4. Lug nut apparatus as set forth in claim 1 wherein:

said lug nuts are formed with said lug nut sockets configured with a cross section having an eight point polygonal shape configured to receive said square lug oriented in two different relative positions.

5. Lug nut apparatus as set forth in claim 1 wherein:

said lug nuts are formed with said lug nut sockets to receive said square lugs configured with one-half inch square cross section.

6. Lug nut apparatus as set forth in claim 1 wherein:

said lug nuts are formed with respective cylindrical peripheral walls.

7. Lug nut apparatus as set forth in claim 1 wherein:

said lug nuts are constructed of stainless steel.

8. A wheel lug nut to be driven by a wrench having a conventional square cross section solid lug and configured for receipt on a threaded lug stud to cooperate in mounting a wheel of the type formed with a lug bore for receipt of said lug stud and formed with an outwardly facing wheel chamfer, said lug nut comprising:

a cylindrical body formed with an internally threaded bore opening to one end for threaded receipt on said stud and further formed at said one end with a radially and axially outwardly tapered chamfer for abutting said wheel chamfer; and said body further formed with an axially outwardly opening lug socket configured with a square cross section to complementally receive said solid square lug.

9. A lug nut as set forth in claim 8 wherein: said cylindrical body is constructed of stainless steel.

10. Lug nut apparatus as set forth in claim 8 wherein:

said lug socket is configured with a three-eighths inch square cross-section.

11. Lug nut apparatus as set forth in claim 8 wherein:

said body is formed with said axially outwardly opening lug socket configured with a cross section having an eight point polygonal shape configured to receive a square drive lug.

12. Lug nut apparatus as set forth in claim 1 for use with a three-eighths inch in square solid drive lug and wherein:

said lug nuts are formed with said lug nut sockets substantially three-eighths in square, open cross section, and sized to receive said square lugs.

13. A lug nut as set forth in claim 8 wherein:

said lug socket is configured with a one-half inch square cross section.

14. Lug nut apparatus as set forth in claim 1 wherein:

said plurality of lug nuts comprises a set of said lug nuts consisting of one said lug nut for each and every said lug stud on said wheel.

15. Lug nut apparatus as set forth in claim 14 wherein:

said plurality of lug nuts comprises one said set for each and every said wheel on a vehicle.

16. A lug nut as set forth in claim 8 wherein:

said body is formed with a through axial passage defining said socket projecting axially distal of said threaded bore.

17. Lug nut apparatus as set forth in claim 8 wherein:

said apparatus comprises a plurality of said sets consisting of one said set for each and every said wheel on a vehicle.

18. Lug nut apparatus as set forth in claim 1 wherein:

said lug nuts are formed with said lug sockets configured with a selected depth and are of a constant cross section throughout said depth.

19. Lug nut apparatus as set forth in claim 8 wherein:

said body is configured with a selected depth and is of a constant cross section throughout said depth.

20. Lug nut apparatus as set forth in claim 8 wherein:

said socket is formed on its opposite sides with facets projecting parallel to one another.

21. A wheel lug nut to be driven by a wrench having a conventional square cross section solid lug and configured for receipt on a threaded lug stud to cooperate in mounting a wheel of the type formed with a lug bore for receipt of said lug stud and formed with an outwardly facing wheel chamfer, said lug nut comprising:

a cylindrical body formed with a through axial opening having an axial inner section and an axial outer section, said body being formed in said axial inner section with one-half inch diameter threaded bore opening for threaded receipt on said stud;

said body being further formed at its axially inner end with a radially and axially outwardly tapered chamfer for abutting said wheel chamfer; and said body even further formed at said axial outer section with an axially outwardly opening eight point star shaped lug socket configured with two interposed square cross sections rotated about the axis of said lug 45° to one another to complementally receive said solid square lug in two different positions.

22. A wheel lug nut according to claim 21 wherein:

said body is formed with said socket configured with corners at the distal tip of the respective said square cross sections in said socket and further formed at said corners with axially projecting semi-cylindrical cut outs.

23. A wheel lug nut according to claim 22 wherein:

said cut outs are formed with respective radii of between 0.532 and 0.538 inches.

* * * * *

UNITED STATES PATENT AND TRADEMARK OFFICE
CERTIFICATE OF CORRECTION

PATENT NO. : 5,797,659
DATED : August 25, 1998
INVENTOR(S) : Everett Fuller, Russell Fuller, Jamie Satre It is certified that error appears in the above-identified patent and that said Letters Patent is hereby corrected as shown below:

On the title page, item [75]: Inventor: Everett Fuller, Orange, Calif insert "Russell Fuller, Huntington Beach, Calif. and Jamie Satre, Anaheim, Calif.

Column 1, line 66, delete "4,681,299" and insert --4,427,326--;

Column 3, line 59, delete "leg" and insert --lug--;

Column 4, line 44, delete "ad" and insert --and--;

line 54, after "is" insert --an--.

Signed and Sealed this

First Day of December, 1998

*Attest:*

BRUCE LEHMAN

*Attesting Officer*     *Commissioner of Patents and Trademarks*